June 16, 1964　　　J. R. MULLEN　　　3,137,418
DISPENSERS

Filed April 28, 1961　　　　　　　　　　3 Sheets-Sheet 1

JERRY R. MULLEN
*INVENTOR.*

BY *Maurice W. Graly*
ATTORNEY

June 16, 1964 J. R. MULLEN 3,137,418
DISPENSERS

Filed April 28, 1961 3 Sheets-Sheet 2

JERRY R. MULLEN
*INVENTOR.*

BY *Maurice Co. Graly*
ATTORNEY

United States Patent Office 3,137,418
Patented June 16, 1964

3,137,418
DISPENSERS
Jerry R. Mullen, 186 Read St., Crestwood, N.Y.
Filed Apr. 28, 1961, Ser. No. 106,410
6 Claims. (Cl. 222—456)

This invention relates to dispensers and particularly to dispensers by which material such as a granulated or powdered food may be delivered from a container to a place of use.

The principal object of the invention is to provide a dispenser for a container holding material consisting of small particles, such dispenser being adapted to deliver the material from the container to a point of use outside the container in response to simple manual rotation of the container.

Another object of the invention is to provide a dispenser which is built into the container and functions in response to gravity as the container and dispenser are rotated.

Still another object is to provide such a dispenser in which metered amounts of material may be delivered from the container by a simple manual rotation of the unit.

Another object is to provide such a container having a built-in dispenser which includes a chamber or trap into which material held in the container is supplied by gravity when the container is rotated manually about a selected axis and from which it is delivered to a point of use outside the container by continued manual rotation of the container.

Another object is to provide such a container equipped with a built-in dispenser which has no spouts projecting therefrom so that the containers may be packed for delivery in a minimum of space.

Another object is to provide such a dispenser made of an inexpensive plastic which can be formed cheaply by mass production methods.

Other and further objects of the present invention will be apparent from the following description, the accompanying drawings, and the appended claims.

Figure 1:
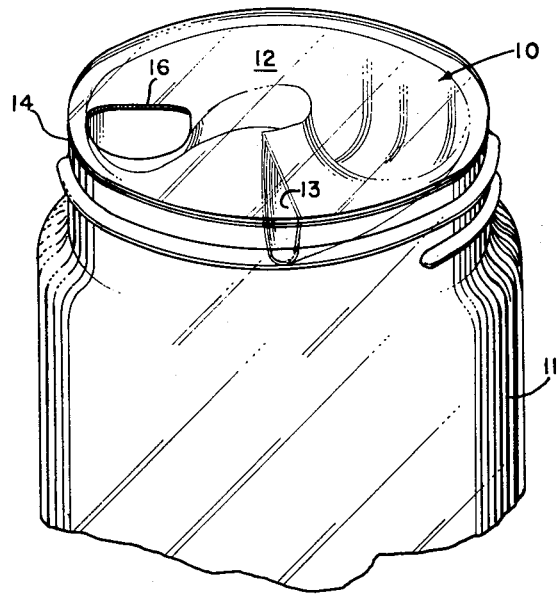
Figure 2:
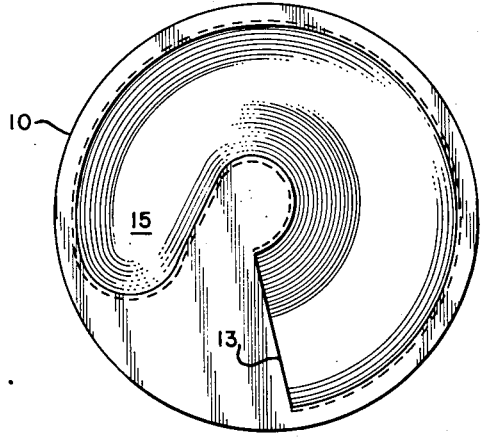
Figure 3:
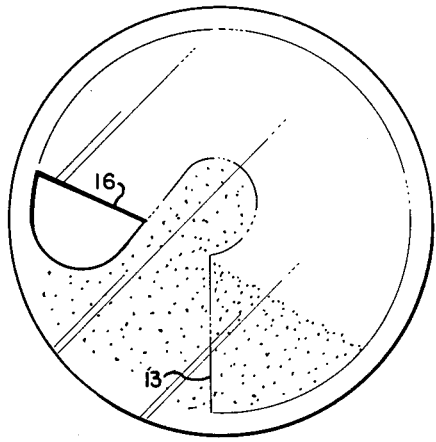
Figure 4:
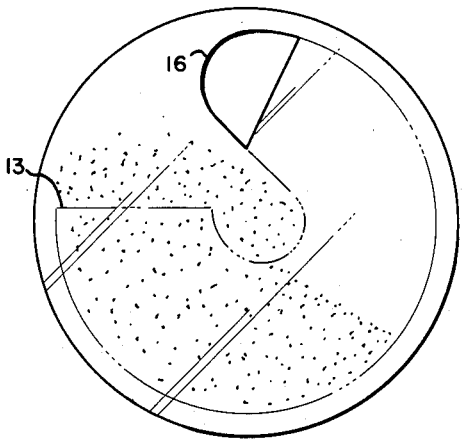
Figure 5:
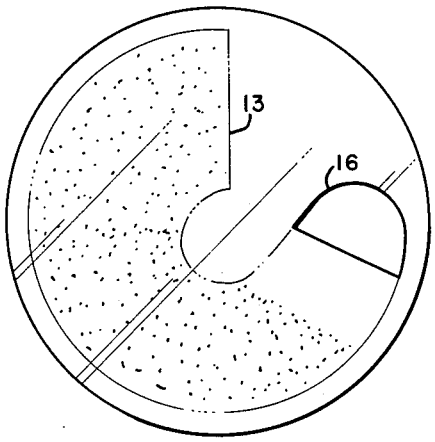
Figure 6:
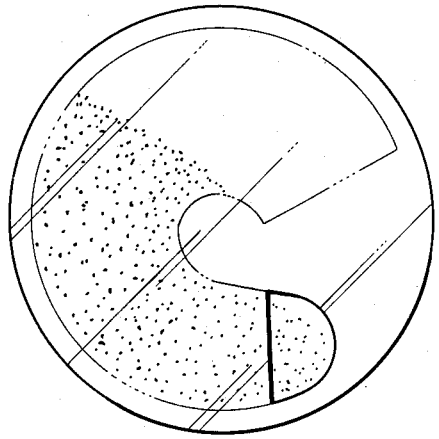

In the drawings, FIG. 1 shows the dispensing unit of the present invention applied to the top of a container;

FIG. 2 is a top view of the dispenser with the covering seal removed; and,

FIGS. 3, 4, 5, and 6 diagrammatically illustrate the dispenser in successive positions as the container is rotated about its axis. FIG. 3 shows the dispenser at the start of its loading; FIG. 4 half way through its loading; FIG. 5 at the completion of loading just before discharging begins; and FIG. 6 shows loading completed and discharge taking place.

Figure 7:
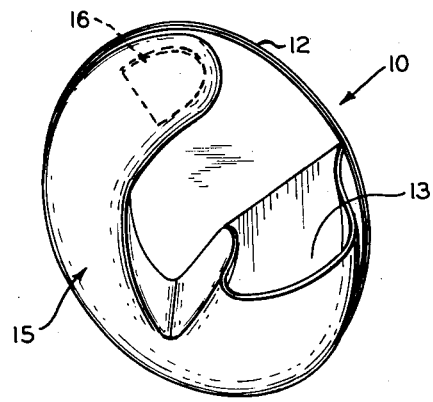
Figure 8:
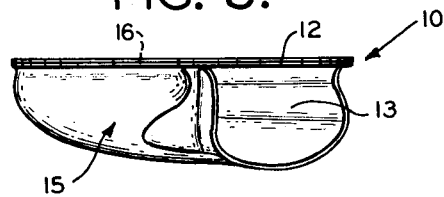
Figure 9:
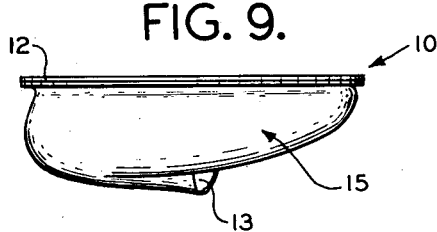

FIG. 7 is a detail perspective view looking up toward the bottom of the dispensing top made in accordance with the instant invention. FIG. 8 is a front elevation view of FIG. 7. FIG. 9 is left end side view of FIG. 8.

Referring now to the drawings, the dispensing device of the invention is illustrated as a helical unit 10 applied to a cylindrical container 11 of about quart size. The container may be formed of glass, plastic, or similar cheap material suitable for the storage of granulated or powdered material such as sugar, coffee, or other food stuffs which have been manufactured for serving in small metered amounts. Unit 10 is substantially tubular, although in the illustrative embodiment it is flattened at the top to provide for easier joining to a closure or cover 12. The unit extends about three-quarters of a complete turn around the top or delivery end portion of the container. It is open at both ends. The mouth or intake end 13, which is located near but spaced laterally from the container wall 14, is disposed so that the plane of its opening is preferably radial to the longitudinal axis of the container. The outlet or delivery end 15 is formed to terminate in an opening 16 in the top closure or cover 12 of the container.

In use, the loaded container is taken in hand and tipped so that its top end is down to permit the granular or powdered content to flow downwardly to completely cover to engulf the supply end of the unit 10. To pour the contents from the container, the most convenient position in which it should be held is with its longitudinal axis somewhere in the zone of 30° to 75° down from table level. When the container is thus disposed in pouring position, it is slowly rotated manually in the clockwise direction as indicated by the arrow in FIG. 1. That is to say, it should be rotated about a selected axis disposed in a selected position so that its mouth will move circumferentially and upwardly to permit the material content to drop into the dispenser by gravity. As the mouth reaches the six o'clock position (as shown in FIG. 3), material will begin to flow into the tube. As the rotation continues (see FIGS. 4 and 5), material will continue to drop into the tube until the mouth reaches the twelve o'clock position. As the rotation continues beyond that position, obviously no more material can drop into the unit. It should be emphasized that there is no scooping of material but that its flow is gravitational.

As to delivery of material from the unit, material will start to flow out of opening 16 when it has been rotated into approximately five o'clock position and will continue so to flow until the dispenser is empty.

The container to which the dispenser is applied is illustrated as cylindrical. It may, however, be of other shapes. Any hollow body, regularly or irregularly shaped, can receive the dispenser, the only limitation being that the hollow body be rotatable about a selected axis. The dispenser unit is spaced radially from the axis of rotation and extends circumferentially about the selected axis.

The unit 10 is shown as substantially tubular throughout. Although this construction is preferable in order to provide for a smooth flow of material, it is not required. The middle portion of the dispenser may be enlarged. Essentially the unit is a combination of a trapping chamber with inlet and outlet openings, the combination being so arranged that when the container is rotated, the combination moves therewith in such a manner that material stored in the container drops through the inlet opening into the trap through substantially 180° of rotation. The inlet opening is arranged so that upon completion of the 180° loading rotation, no further drop into the trap is permitted for the following 180° of rotation. Material thus trapped drops out of the chamber through the outlet opening as the rotation continues after the completion of loading. The outlet is spaced angularly from the inlet a predetermined amount so that gravity flow of material out of the trap begins shortly after the completion of the intake into the trap.

The inlet mouth 13 is illustrated as circular and disposed in a plane radial to the longitudinal axis of the container. This is preferable but not essential. The invention is satisfied if the mouth is spaced radially from the axis selected for rotation and is so defined by the inlet forming means that upon such rotation it will move circumferentially to permit the flow of material through it in response to gravity.

It is obvious that the dispenser, as thus described, will not function for liquid. There would be an uninterrupted flow of liquid through the dispenser whenever the liquid level within the container is higher than the level of the delivery opening. In the case of a container full of liquid, there would be an outflow whenever the container would be tipped even slightly from the vertical.

In practice, it may be found expedient to close the delivery opening 16 with some removable means so that there will be no leakage in shipment. A cap for the container may also be provided if desired.

While there has been hereinbefore described an approved embodiment of this invention, it will be understood that many and various changes and details of construction may be made without departing from the spirit of this invention and that all such changes and modifications as fall within the scope of the appended claims are contemplated as a part of this invention.

What I claim is:

1. A dispenser for a container of the class which stores granulated material such as sugar and which is manually rotatable about a selected axis, such dispenser comprising means forming a helical chamber disposed within and rotatable with the container, said chamber having an inner baffle wall, inlet means defining an opening into said chamber spaced radially from said selected axis and rotatable with the chamber forming means, and outlet means defining an opening from said chamber extending through a wall of the container, said chamber being sized to permit the free flow of material therethrough, said outlet means being spaced radially from the selected axis and angularly disposed at least 220° from the inlet means and being rotatable with the chamber forming means, and said baffle wall extending at least half way across the diameter of said dispenser from said outlet means, the inlet means being so sized to provide unrestricted flow of material thereinto so that when the container is rotated about said selected axis in a selected tilted position, material stored in the container will flow freely by gravity through the inlet means into the chamber during 180° of rotation but will be prevented from flowing therethrough during the remaining 180° of rotation, and the outlet means being sized to permit the unrestricted flow of material therethrough and so disposed angularly in reference to the inlet means so that during such rotation of the container material will begin to flow unrestrictedly out of the chamber in response to gravity after inlet flow has been completed.

2. A dispenser for a container carrying a granulated material such as sugar comprising means forming a chamber in the container, an inlet opening into the chamber, and an outlet opening from the chamber spaced from the inlet opening, said chamber and said inlet opening and outlet opening respectively being sufficiently large to permit the free unrestricted flow of said material therethrough the inlet opening being angularly disposed with respect to said outlet so that when the container is positioned with its chamber downward to permit the contained material to flow freely downward to cover the inlet opening, rotation of the container about a selected axis will cause a predetermined amount of the granulated material in the container to drop into the chamber by gravity and whereupon further rotation of the container without righting the container will positively cut off the flow of material to said chamber while permitting the material in said chamber to drop freely out of said chamber through the outlet opening.

3. In a container of the class which stores granular material, a dispenser comprising means forming a helical chamber disposed within the container, said chamber being tubular and extending circumferentially of a selected axis, the ends of said tubular chamber being circumferentially spaced from each other at least 220°, inlet means defining an opening into said chamber at one end thereof; and outlet means defining an opening from said chamber at the other end thereof, said inlet and outlet openings being sufficiently large to permit the free and unrestricted flow of material therethrough the arrangement of the chamber being sized so as to permit the unrestricted flow of material therethrough so that when the container and dispensed are rotated about a selected axis in the tilted position of the container, material in the container will freely flow by gravity through the inlet means and through the chamber during part of its rotation whereupon further rotation thereof will effect a positive cut off the flow of material into the chamber while permitting the material in the chamber to flow unrestrictedly out by gravity.

4. In a container of the class which stores granular material, a dispenser comprising means forming a helical chamber sufficiently large to permit the free flow of granular material therethrough within the container, inlet means defining an opening into said chamber; outlet means defining an opening from said chamber, said inlet opening and outlet opening respectively being sufficiently large to permit the unrestricted flow of said granular material therethrough said inlet and outlet means being circumferentially spaced from each other at least 220°; and means forming a partition in the chamber between the inlet and outlet means and extending more than half way across the dispenser from the outlet means the arrangement being such that when the container and dispenser are rotated about a selected axis, material in the container will flow freely by gravity through the inlet means into the chamber during part of its rotation, and upon further rotation of the container, said partition effecting a positive cutting off the free flow of material into the chamber while permitting the material in the chamber to flow freely therefrom by gravity.

5. A dispenser for dispensing substantially equal predetermined amounts of granulated material on each dispensing operation from a container in which said granulated material is stored, said dispenser comprising a top adapted to span the opening of the container, said top having a discharge opening formed therein, means defining a helical chamber to form a passageway sized to provide for an unrestricted flow of material therethrough communicating with said discharge opening and having an inlet opening angularly disposed with respect to said discharge opening, said inlet and outlet openings respectively being sufficiently large to permit the free flow of said granular material therethrough and said inlet opening being angularly disposed out of the plane of said discharge opening, a material cutoff means disposed within said chamber between said inlet and outlet openings so that in a tilted position of the container said chamber is first filed upon rotation of the top through a given angular distance with a predetermined amount of material and whereupon further rotation of the top without uprighting the container said material cutoff means positively cuts off the flow of material through the chamber while permitting the predetermined amount of material in the chamber to flow out therefrom by gravity for effecting the dispensing of a said predetermined quantity of material from said chamber on each revolution of the dispenser.

6. A dispenser for a container of the class which stores granular material and adapted to dispense from the container substantially equal predetermined amount of material upon each dispensing operation, said dispenser comprising a top, means including a baffle wall defining a helical tubular chamber circumferentially arranged on the side of the top exposed to the material in the container, said chamber being sized to permit unrestricted flow of said granular material therethrough one end of said chamber terminating in an opening disposed at an angle to said top to provide an inlet to said chamber, the other end of the chamber terminating in an opening disposed in said top to provide an outlet therefrom, said inlet opening and said outlet opening respectively being sufficiently large to provide for the free unrestricted flow of said granular material into and out of said chamber, the inlet and outlet for said chamber being circumferentially and angularly spaced from one another by said baffle wall, said baffle wall extending at least halfway across the diameter of said dispenser from said outlet so that in a tilted position of the container the chamber is first filled with a predetermined amount of material upon rotation of the top through a predetermined angular distance whereby said baffle upon further rotation of the top without uprighting the container effects a positive cutoff of the flow of the material into the chamber while permitting the predetermined amount of material in said chamber to flow out therefrom by gravity.

References Cited in the file of this patent

UNITED STATES PATENTS

| | | |
|---|---|---|
| 2,190,092 | Bailey | Feb. 13, 1940 |
| 2,657,836 | Heinz et al. | Nov. 3, 1953 |